United States Patent
Kaneko (10) Patent No.: US 9,046,031 B2
(45) Date of Patent: Jun. 2, 2015

(54) CYLINDER INJECTION ENGINE

(75) Inventor: Makoto Kaneko, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 497 days.

(21) Appl. No.: 12/926,926

(22) Filed: Dec. 17, 2010

(65) Prior Publication Data

US 2011/0146620 A1   Jun. 23, 2011

(30) Foreign Application Priority Data

Dec. 22, 2009   (JP) .................. 2009-291112

(51) Int. Cl.
  *F02B 23/10*   (2006.01)
  *F02D 13/02*   (2006.01)

(52) U.S. Cl.
  CPC ......... F02B 23/105 (2013.01); *F02B 2023/102* (2013.01); *F02B 2023/106* (2013.01); F02D 13/0215 (2013.01); F02D 13/0246 (2013.01); F02D 13/0261 (2013.01); *Y02T 10/125* (2013.01); *Y02T 10/18* (2013.01)

(58) Field of Classification Search
  CPC ............... F02B 2023/102; F02B 2023/107; F02B 2023/106; F02B 23/105; F02D 13/0215; F02D 13/0246; F02D 13/0261; Y02T 10/125; Y02T 10/18
  USPC ........ 123/90.15–90.18, 188.1, 305, 306, 308, 123/188.7, 188.8, 188.14
  See application file for complete search history.

(56) References Cited

U.S. PATENT DOCUMENTS

| | | | | |
|---|---|---|---|---|
| 4,548,175 A | * | 10/1985 | Kawai et al. | 123/308 |
| 4,974,566 A | * | 12/1990 | LoRusso et al. | 123/308 |
| 5,423,300 A | * | 6/1995 | Ando et al. | 123/432 |
| 5,487,365 A | * | 1/1996 | Isaka | 123/306 |
| 5,575,254 A | * | 11/1996 | Tsuchida et al. | 123/308 |
| 5,960,767 A | * | 10/1999 | Akimoto et al. | 123/298 |
| 6,408,816 B1 | * | 6/2002 | Tomita et al. | 123/295 |
| 6,810,844 B2 | * | 11/2004 | Sellnau | 123/90.16 |
| 7,357,117 B2 | * | 4/2008 | Yoshikawa | 123/308 |

FOREIGN PATENT DOCUMENTS

JP   2002-155748 A   5/2002

* cited by examiner

*Primary Examiner* — Erick Solis
*Assistant Examiner* — Carl Staubach
(74) *Attorney, Agent, or Firm* — McGinn IP Law Group, PLLC (57) ABSTRACT

A mask portion is provided at a partial area of an intake port at a side opposite to an exhaust port. The mask portion prevents a part of the intake port from being opened when the intake valve is in a low lift state. A top surface of a piston includes a smooth surface. An ECU sets the maximum lift of the intake valve for a variable valve mechanism to an intermediate lift and sets a fuel injection timing for an injector to a compression stroke when an operating range of the engine is a fast idle range. The intermediate lift is an amount of lift at which the intake valve is moved beyond the mask portion and a flow rate of intake air in the partial area is limited relative to a flow rate of the intake air in other areas owing to the mask portion.

11 Claims, 7 Drawing Sheets

CYLINDER INJECTION ENGINE

CROSS-REFERENCE TO RELATED APPLICATIONS

The present application claims priority from Japanese Patent Application No. 2009-291112 filed on Dec. 22, 2009, the entire contents of which are hereby incorporated by reference.

BACKGROUND OF THE INVENTION

1. Field of the Invention

The present invention relates to a spark-ignition cylinder injection engine which directly injects fuel into a cylinder using a high-pressure injector.

2. Description of the Related Art

In general, a cylinder injection engine is capable of accurately controlling parameters such as a fuel injection timing and an amount of fuel injection. Therefore, selective switching between homogeneous combustion (premixed homogeneous combustion) and stratified charge combustion can be easily performed in accordance with an operating state of the engine. The stratified charge combustion may be performed, for example, in a fast idle period immediately after the start of the engine. Accordingly, ignition timing can be retarded without reducing ignition quality and a large amount of thermal energy generated by the combustion can be supplied to an exhaust side. As a result, catalyst can be quickly activated.

Japanese Unexamined Patent Application Publication No. 2002-155748 (hereinafter referred to as Patent Document 1) discloses a cylinder injection engine of this type in which a cavity for guiding fuel injected from an injector toward a spark plug is provided at the top of a piston and a mask wall that prevents a part of an intake port from being opened by an intake valve is provided on the intake port. An amount of lift of the intake valve is variably controlled to selectively switch between the homogeneous combustion and the stratified charge combustion. According to the technique described in Patent Document 1, in an operating range in which an engine rotational speed and an engine load are both relatively low, a maximum lift of the intake valve is set to a high lift so that an injection flow rate is reduced. Accordingly, the cavity at the top of the piston effectively functions, and the stratified charge combustion can be achieved. In addition, in an operating range in which the engine rotational speed and the engine load are both relatively high, the maximum lift of the intake valve is set to a predetermined amount of lift at which the intake valve is not moved beyond the mask wall so that the injection flow rate is increased. Accordingly, a strong tumble flow is generated in the cylinder, and the homogeneous combustion (homogeneous combustion) can be achieved. In an operating range in which the engine rotational speed and the engine load are both further higher, the maximum lift of the intake valve is set to a high lift (or an intermediate lift at which the intake valve is moved slightly beyond the mask wall), so that a large amount of intake air is sucked into the cylinder. Accordingly, uniformly mixed fuel-air mixture can be provided.

However, when the cavity for stratifying the fuel-air mixture is formed at the top of the piston as in Patent Document 1, the cavity serves to reduce the persistence of the tumble flow. Therefore, as a result, there is a risk that the fuel consumption efficiency during the homogeneous combustion will be degraded.

The reduction in the persistence of the tumble flow can be compensated for by using devices such as a high-tumble port or a tumble-generating valve (TGV). However, these devices may serve as a flow-passage resistance, which makes it difficult to increase the maximum engine output.

SUMMARY OF THE INVENTION

In view of the above-described situation, an object of the present invention is to provide a cylinder injection engine capable of appropriately stratifying the fuel-air mixture during the stratified charge combustion without reducing the persistence of the tumble flow of the intake air during the homogeneous combustion.

According to an aspect of the present invention, a cylinder injection engine includes a spark plug including a spark portion that faces an inner space of a cylinder at a position between an intake port and an exhaust port, the intake port being opened and closed by an intake valve and the exhaust port being opened and closed by an exhaust valve; a fuel injection valve provided with an injection hole that faces the inner space of the cylinder at a position farther from the exhaust port than the intake port; a variable valve mechanism capable of switching a maximum lift of at least the intake valve in each combustion cycle; a mask portion provided at a partial area of the intake port at a side opposite the exhaust port so as to stand in a direction in which the intake valve is lifted, the mask portion preventing a part of the intake port from being opened when the intake valve is in a low lift state in which an amount of lift of the intake valve is smaller than or equal to a set amount of lift; a piston having a top surface including a smooth surface in an area further toward the inside than a squish area; and control means that sets the maximum lift of the intake valve for the variable valve mechanism to an intermediate lift and sets a fuel injection timing of the fuel injection valve to a compression stroke when an operating range of the engine is a fast idle range that is immediately after a start of the engine, the intermediate lift being an amount of lift at which the intake valve is moved beyond the mask portion and a flow rate of intake air in the partial area is limited relative to a flow rate of the intake air in other areas owing to the mask portion.

The cylinder injection engine according to the present invention is capable of appropriately stratifying the fuel-air mixture during the stratified charge combustion without reducing the persistence of the tumble flow of the intake air during the homogeneous combustion.

DESCRIPTION OF THE PREFERRED EMBODIMENT

Figure 1:
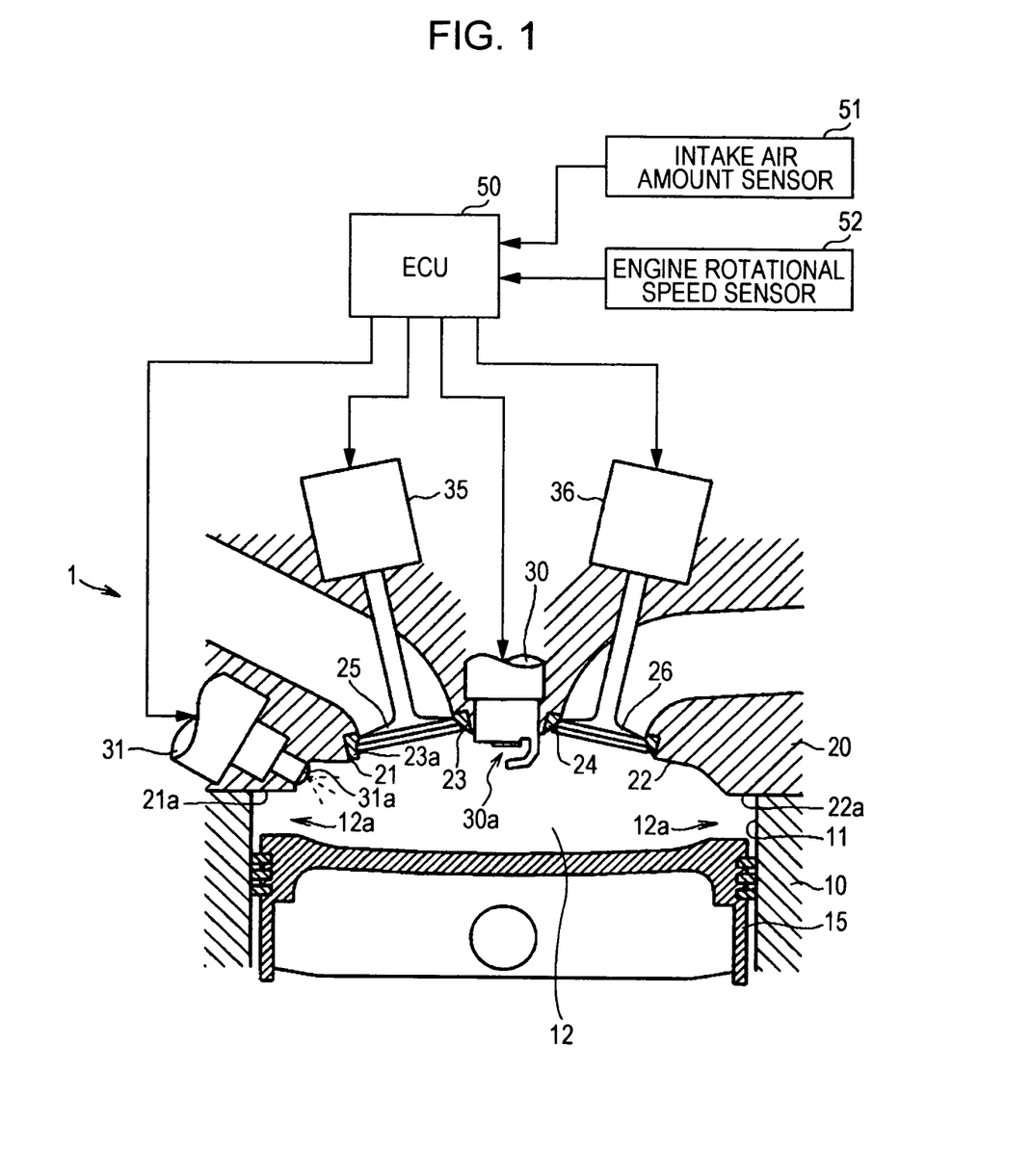
FIG. 1 is a schematic diagram illustrating the main part of an engine.
Figure 2:
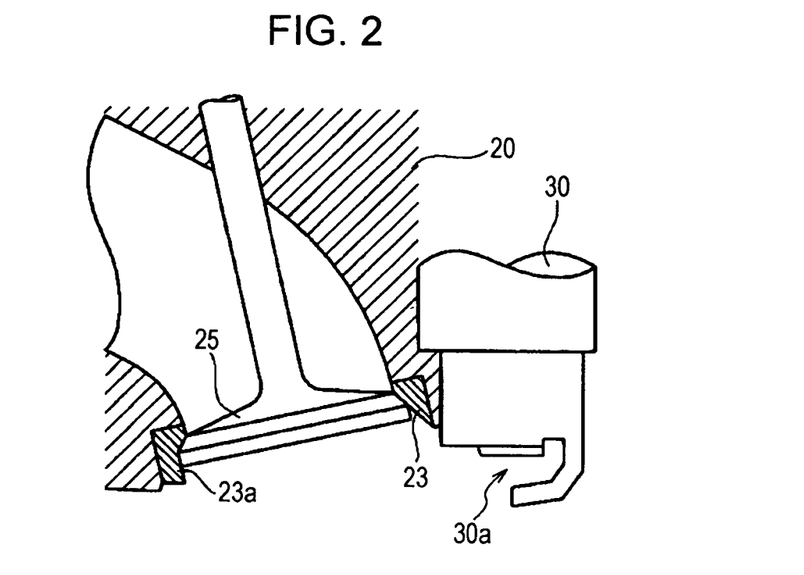
FIG. 2 is a sectional view of an area around an intake port of a cylinder head.
Figure 3:
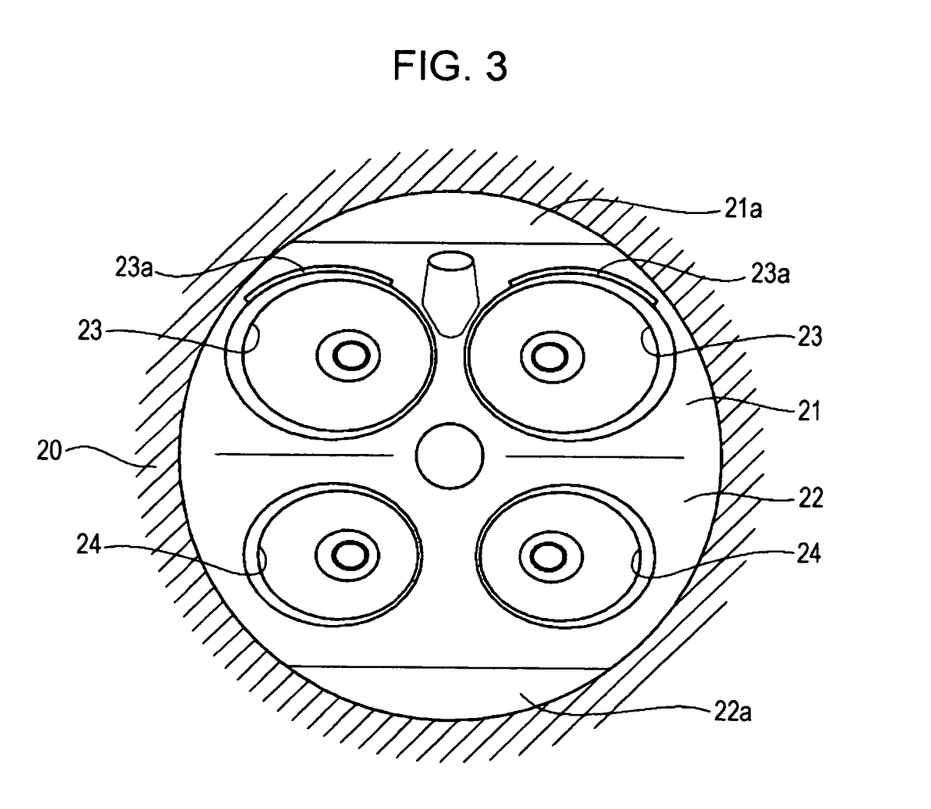
FIG. 3 is a bottom view of the cylinder head.
Figure 4:
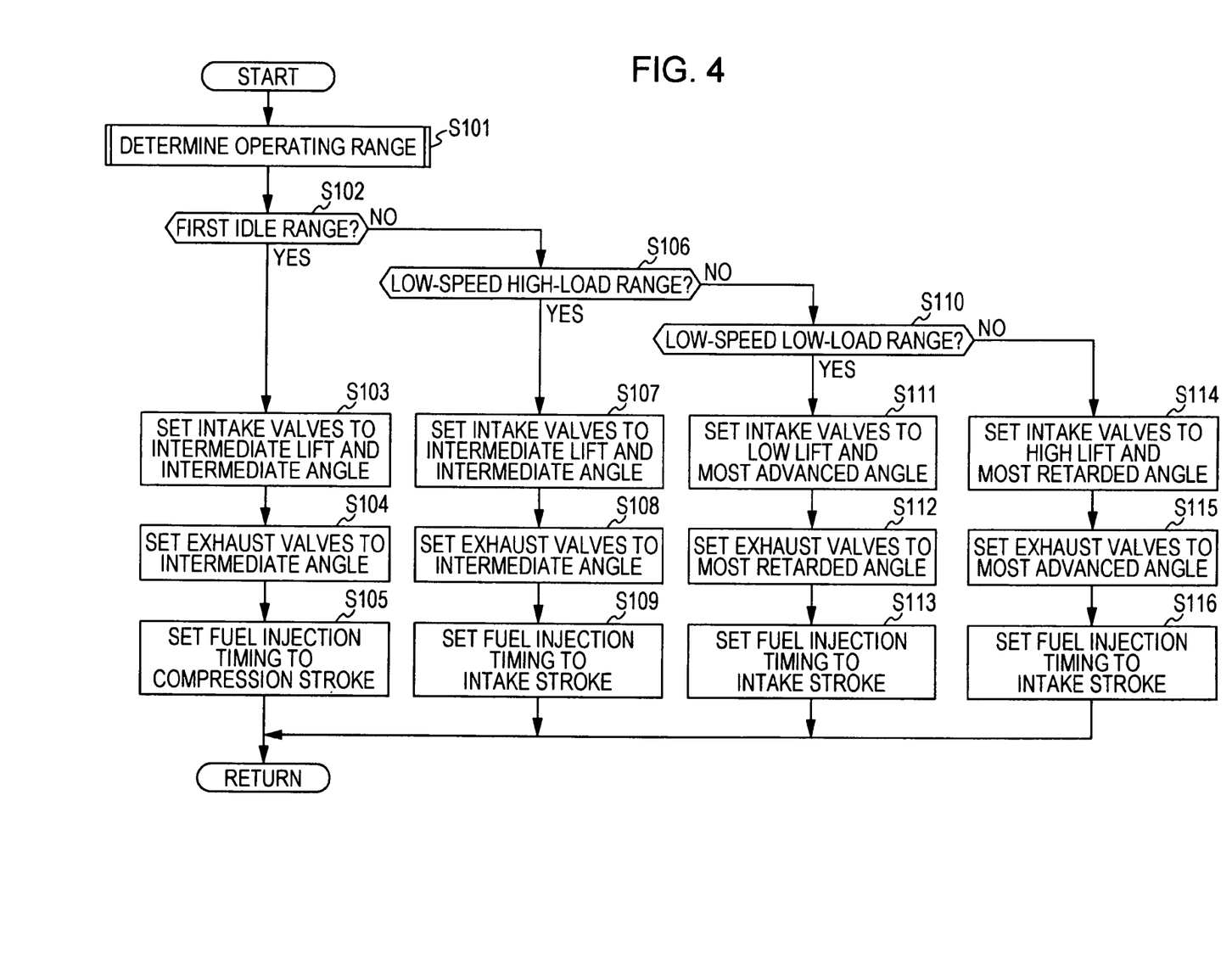
FIG. 4 is a flowchart of a routine for setting control parameters of the engine.
Figure 5:
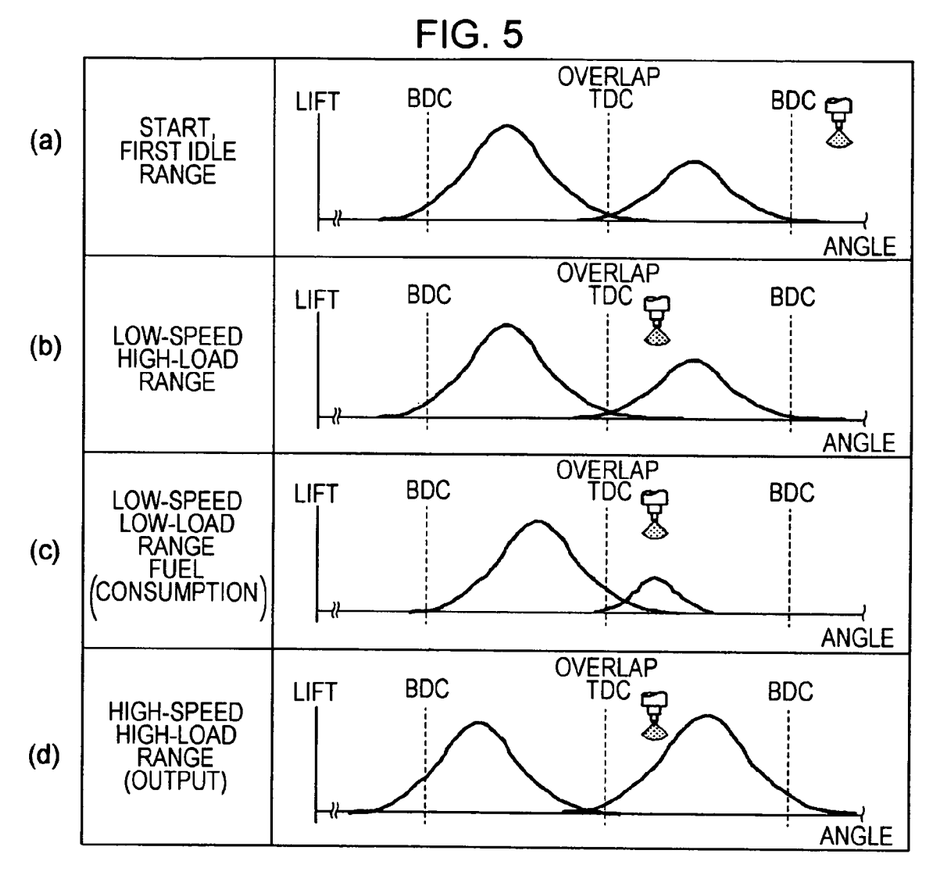
FIG. 5 is a diagram illustrating control states corresponding to respective operating ranges.
Figure 6:
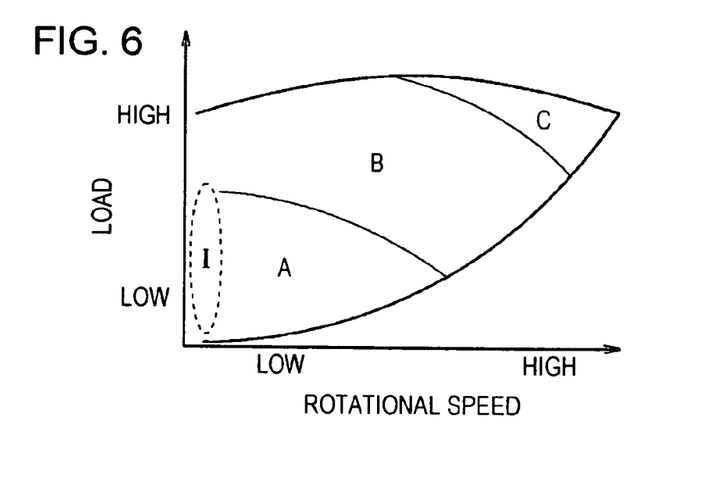
FIG. 6 is a graph illustrating the relationship between the engine rotational speed, the engine load, and the operating ranges.
Figure 7A:
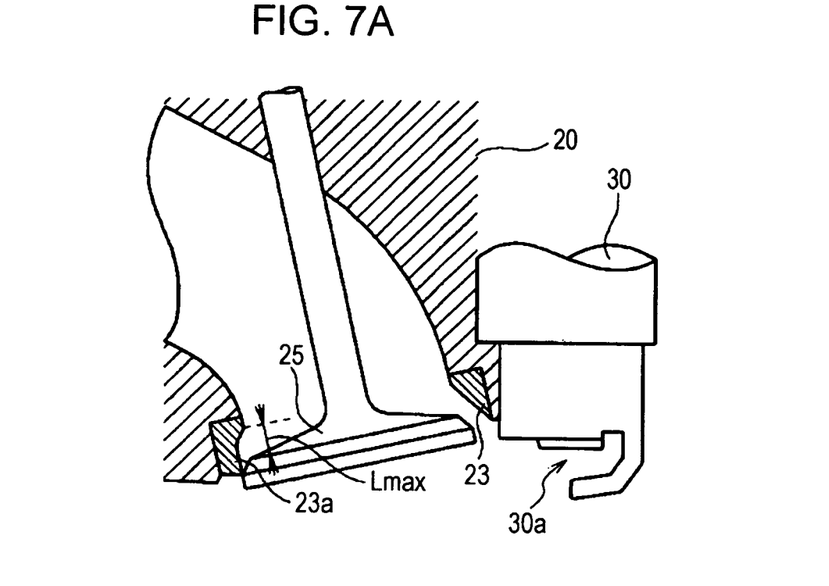
FIG. 7A is a diagram illustrating the relationship between an intake valve and a mask when a maximum lift of the intake valve is set to a low lift.
Figure 7B:
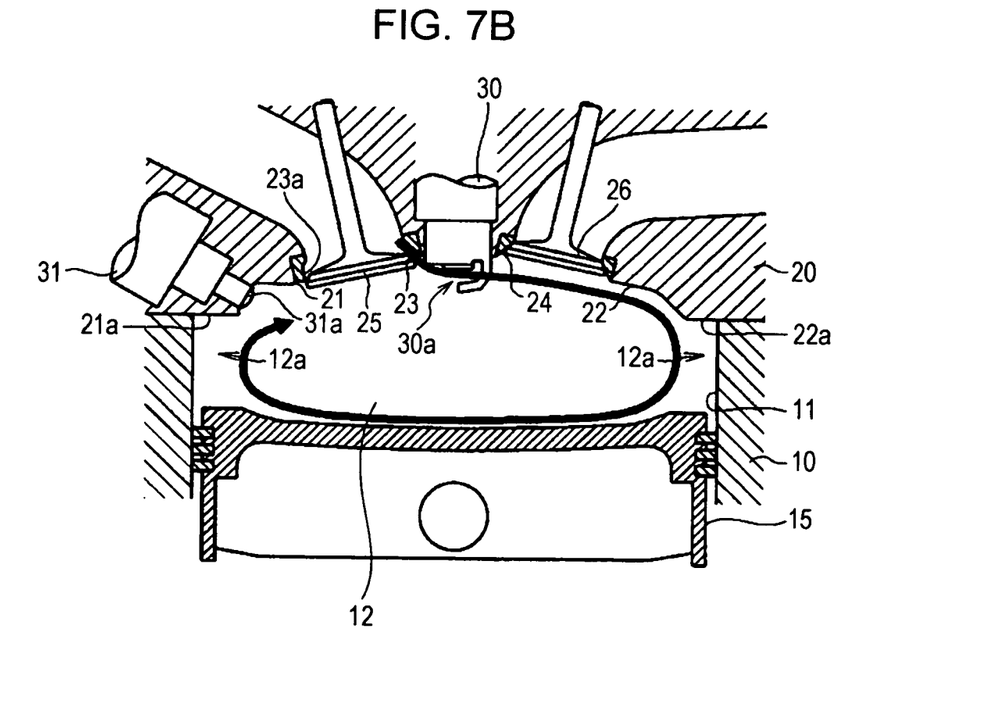
FIG. 7B is a diagram illustrating the manner in which a tumble flow is generated when the maximum lift of the intake valve is set to the low lift.
Figure 8A:
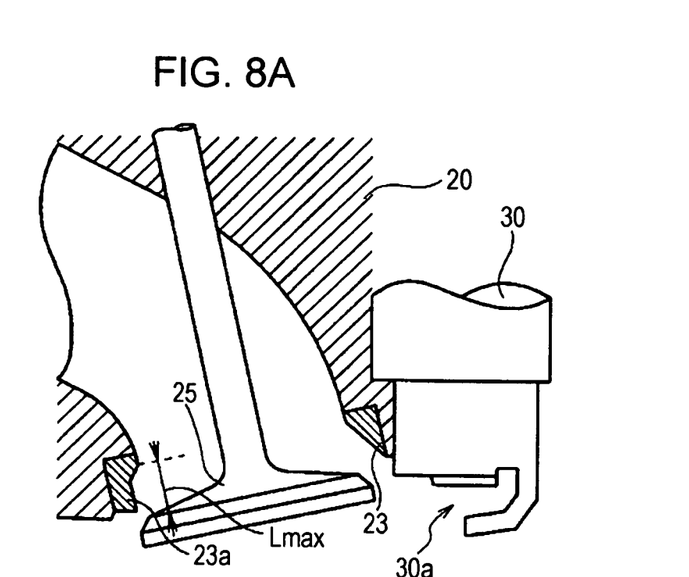
FIG. 8A is a diagram illustrating the relationship between the intake valve and the mask when the maximum lift of the intake valve is set to an intermediate lift.
Figure 8B:
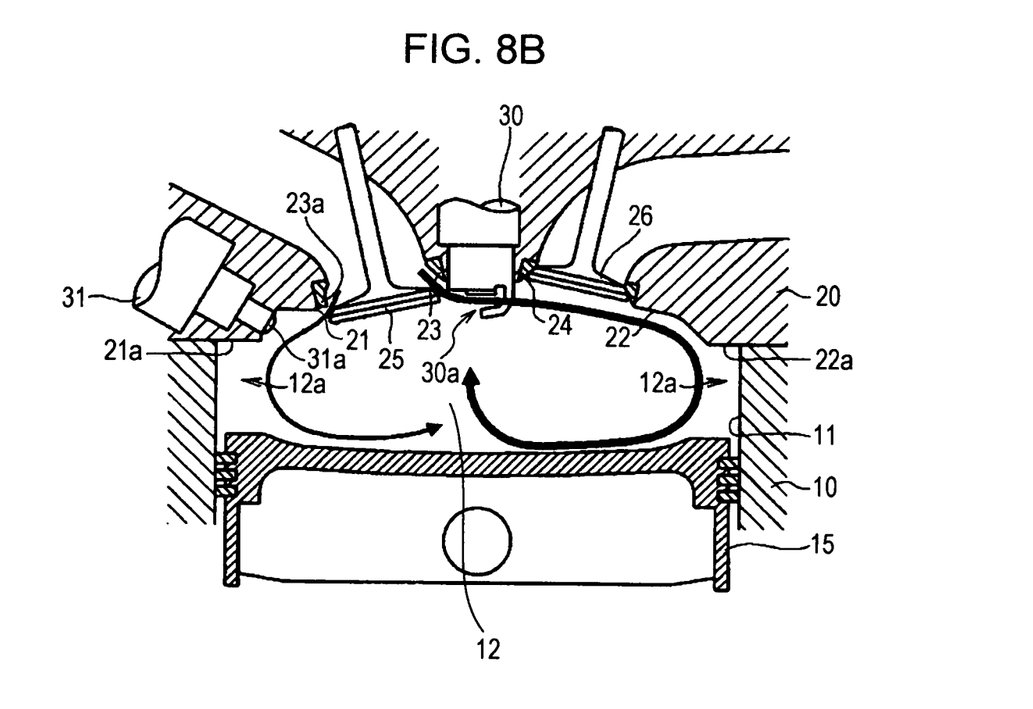
FIG. 8B is a diagram illustrating the manner in which tumble flows are generated when the maximum lift of the intake valve is set to the intermediate lift.
Figure 9A:
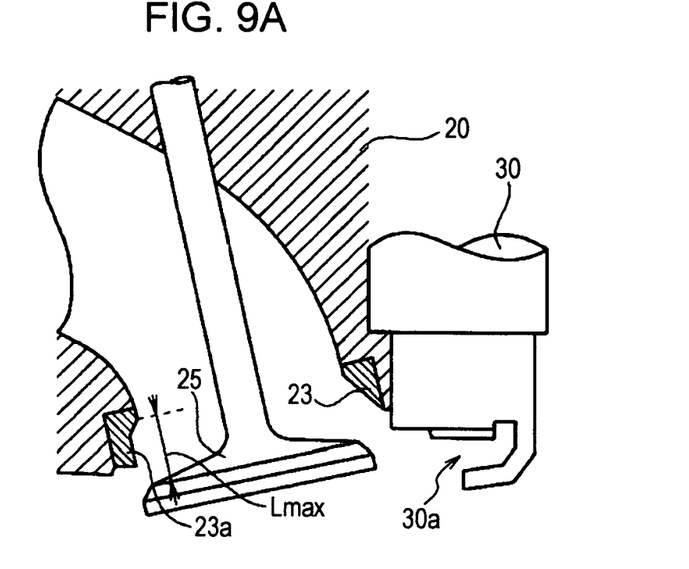
FIG. 9A is a diagram illustrating the relationship between the intake valve and the mask when the maximum lift of the intake valve is set to a high lift.
Figure 9B:
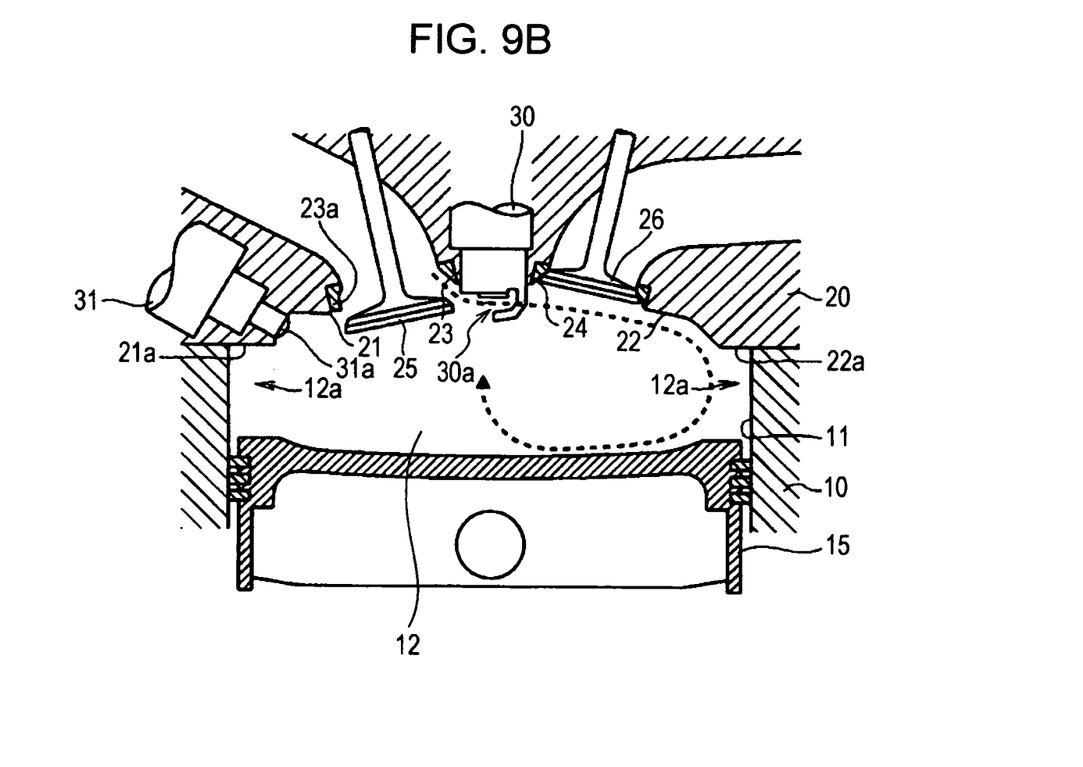
FIG. 9B is a diagram illustrating the manner in which a tumble flow is generated when the maximum lift of the intake valve is set to the high lift.

An embodiment of the present invention will now be described with reference to the accompanying drawings. The drawings illustrate the embodiment of the present invention. FIG. 1 is a schematic diagram illustrating the main part of an engine. FIG. 2 is a sectional view of an area around an intake port of a cylinder head. FIG. 3 is a bottom view of the cylinder head. FIG. 4 is a flowchart of a routine for setting control parameters of the engine. FIG. 5 is a diagram illustrating control states corresponding to respective operating ranges. FIG. 6 is a graph illustrating the relationship between the engine rotational speed, the engine load, and the operating ranges. FIG. 7A is a diagram illustrating the relationship between an intake valve and a mask when a maximum lift of the intake valve is set to a low lift. FIG. 7B is a diagram illustrating the manner in which a tumble flow is generated when the maximum lift of the intake valve is set to the low lift. FIG. 8A is a diagram illustrating the relationship between the intake valve and the mask when the maximum lift of the intake valve is set to an intermediate lift. FIG. 8B is a diagram illustrating the manner in which tumble flows are generated when the maximum lift of the intake valve is set to the intermediate lift. FIG. 9A is a diagram illustrating the relationship between the intake valve and the mask when the maximum lift of the intake valve is set to a high lift. FIG. 9B is a diagram illustrating the manner in which a tumble flow is generated when the maximum lift of the intake valve is set to the high lift.

An engine 1 illustrated in FIG. 1 is a spark-ignition cylinder injection engine. In the present embodiment, the engine 1 is a naturally-aspirated, horizontally-opposed 4 cylinder gasoline engine. The engine 1 includes a cylinder block 10 in which a piston 15 is slidably fitted to each cylinder 11 that is open at the top. A combustion chamber 12 is formed between the piston 15 and a cylinder head 20.

As illustrated in FIGS. 1 and 3, for example, in an area corresponding to each cylinder 11, a pair of inclined surfaces 21 and 22 are formed at the bottom of the cylinder head 20 such that the inclined surfaces 21 and 22 extend obliquely downward from a substantially central area of the cylinder 11. Thus, each combustion chamber 12 is formed in a so-called pent-roof shape by the inclined surfaces 21 and 22. Flat surfaces 21a and 22a are formed continuously from the inclined surfaces 21 and 22, respectively, at the bottom ends thereof. Areas in the combustion chamber 12 that correspond to the flat surfaces 21a and 22a are set as squish areas 12a.

In the pair of the inclined surfaces 21 and 22, two intake ports 23 are formed so as to open into the inclined surface 21, and two exhaust ports 24 are formed so as to open into the other inclined surface 22. In addition, the intake ports 23 and the exhaust ports 24 are provided with intake valves 25 and exhaust valves 26, respectively, for opening and closing the intake ports 23 and the exhaust ports 24.

A spark plug 30 is retained by the cylinder head 20. A spark portion 30a formed at an end of the spark plug 30 faces an inner space of the cylinder 11 at a position between the intake ports 23 and the exhaust ports 24 (in the present embodiment, at a substantially central area of the cylinder 11 at which top portions of the inclined surfaces 21 and 22 are joined).

An injector (fuel injection valve) 31 is also retained by the cylinder head 20. An injection hole 31a in the injector 31 faces the inner space of the cylinder 11 at a position farther from the exhaust ports 24 than the intake ports 23 (in the present embodiment, at a position between the two intake ports 23). The injection hole 31a is at a predetermined angle of depression with respect to the top surface of the piston 15.

As illustrated in FIG. 1, for example, the top surface of the piston 15 has a substantially flat, smooth surface in an area closer to the center than the squish areas 12a. More specifically, the top surface of the piston 15 has a smooth surface that is gently recessed toward the center in the area closer to the center than the squish areas 12a.

In addition, as illustrated in FIGS. 2 and 3, each intake port 23 is provided with a mask portion 23a at an open end thereof, the mask portion 23a being disposed in a partial area at a side opposite the exhaust ports 24. In each intake port 23, the mask portion 23a functions as a flow passage resistance against intake air guided into the cylinder 11 through each intake port 23. The mask portion 23a is formed so as to stand in a direction in which the intake valve 25 is lifted. When the intake valve 25 is in a low-lift state in which the amount of lift of the intake valve 25 is smaller than or equal to a set amount of lift, the mask portion 23a prevents a part of the intake port 23 from being opened. More specifically, in the present embodiment, the mask portion 23a is formed so as to stand in a substantially arc-shaped partial area of each intake port 23 at the side opposite to the exhaust ports 24. When, for example, the intake valve 25 is in a low-lift state in which the amount of lift L is 2 to 3 mm or less, a part of the intake valve 25 slides along the mask portion 23a so that the mask portion 23a prevents the intake port 23 from being opened at the partial area.

The cylinder head 20 is provided with, for example, electric or hydraulic actuators 35 and 36 as a variable valve mechanism capable of switching valve-opening states of the intake valves 25 and the exhaust valves 26 in each combustion cycle. The actuators 35 and 36 drive the intake and exhaust valves 25 and 26, respectively, by arbitrary amounts of lift at arbitrary timings, and are controlled by an engine control unit (ECU) 50 described below, which functions as the control means.

The ECU 50 mainly includes a commonly known microcomputer that includes a central processing unit (CPU), a read-only memory (ROM), a random-access memory (RAM), and an input/output interface. Various sensors and switches, such as an intake air amount sensor 51 and an engine rotational speed sensor 52 that detects an engine rotational speed on the basis of rotation of a crank shaft, are connected to the ECU 50 at an input side thereof.

The ECU 50 determines the operating range of the engine 1 on the basis of various input signals, and sets various control parameters for achieving homogeneous combustion or stratified charge combustion on the basis of the result of the determination. More specifically, the ECU 50 sets a valve-opening timing and a maximum lift Lmax in the open state for the intake valves 25, a valve-opening timing for the exhaust valves 26, and a fuel injection timing in accordance with the determined operating range of the engine 1.

For example, as illustrated in FIG. 6, a map for determining the operating range on the basis of the engine rotational speed and the engine load is stored in the ECU 50 in advance. The ECU 50 selects, for example, a low-speed low-load range A in which power consumption efficiency is prioritized, a low-speed high-load range B, and a high-speed high-load range C in which the output is prioritized as an engine operating state. However, when the time elapsed from the start of the engine 1 is within a set time (for example, within ten and several seconds), the ECU 50 selects a fast idle range I.

In the present embodiment, the ECU 50 selectively sets, for example, one of three amounts of lift, which are a low lift, an intermediate lift, and a high lift, as the maximum lift Lmax of the intake valves 25 in the open state. The low lift is an amount of lift within a range in which each intake valve 25 is not moved beyond the mask portion 23a, and is set to a value in the range of, for example, 2 to 3 mm in the present embodiment. The intermediate lift is an amount of lift at which each intake valve 25 is moved beyond the mask portion 23a and at which a flow rate of the intake air in the partial area that corresponds to the mask portion 23a is limited relative to that in the other area, owing to the influence of the mask portion 23a. In the present embodiment, the intermediate lift is set to, for example, 5 to 6 mm. The high lift is an amount of lift which is greater than the intermediate lift and at which the influence of the mask portion 23a on the intake air can be substantially ignored. In the present embodiment, the intermediate lift is set to, for example, 10 to 11 mm.

Next, the process of setting the control parameters of the engine 1 performed by the ECU 50 will be described with reference to the flowchart of the routine for setting the control parameters illustrated in FIG. 4. This routine is repeatedly executed every set time period. When the routine is started, the ECU 50 determines the operating range of the engine 1 at step S101. More specifically, in step S101, the ECU 50 determines whether or not the time elapsed from the start of the engine 1 is within a set time (for example, within ten and several seconds). If the ECU 50 determines that the elapsed time is within the set time, the ECU 50 selects the fast idle range I as the operating range of the engine 1. If the time elapsed from the start of the engine 1 is longer than or equal to the set time, the ECU 50 selects the operating range of the engine 1 from the low-speed low-load range A, the low-speed high-load range B, and the high-speed high-load range C. The operating range is selected using the preset map (see FIG. 6) on the basis of, for example, the load of the engine 1 estimated from the intake air amount detected by the intake air amount sensor 51 and the engine rotational speed detected by the engine rotational speed sensor 52.

Then, the ECU 50 proceeds from step S101 to step S102, where the ECU 50 determines whether or not the current operating range of the engine 1 is the fast idle range I. The ECU 50 proceeds to step S103 if the operating range of the engine 1 is the fast idle range I, and to step S106 if the operating range of the engine 1 is a range other than the fast idle range I (that is, the low-speed low-load range A, the low-speed high-load range B, or the high-speed high-load range C).

When the ECU 50 proceeds from step S102 to step S103, the ECU 50 sets the maximum lift Lmax of the intake valves 25 in the open state to the intermediate lift (for example, 5 to 6 mm), and sets the valve-opening timing of the intake valves 25 to an intermediate angle. Then, the ECU 50 proceeds to step S104, where the ECU 50 sets the valve-opening timing of the exhaust valves 26 to an intermediate angle. Then, the ECU 50 proceeds to step S105, where the ECU 50 sets the fuel injection timing of the injector 31 to a compression stroke (see part (a) in FIG. 5). Then, the routine is terminated.

Owing to the above-described settings, appropriate stratified charge combustion can be achieved in the fast idle range I of the engine 1.

More specifically, when the maximum lift Lmax of the intake valves 25 is set to the intermediate lift, in the first half of the operation of lifting the intake valves 25, each intake port 23 is opened only at the area where the mask portion 23a is not provided, that is, at the area near the exhaust ports 24. The intake air is guided into the combustion chamber 12 through this area and flows along the top surface of the pent-roof-shaped combustion chamber 12 toward the exhaust valves 26. Thus, a tumble flow is generated. The tumble flow in this direction is referred to as a positive tumble flow.

Then, in the second half of the operation of lifting the intake valves 25, each intake port 23 is further opened at the partial area that corresponds to the mask portion 23a. Accordingly, the intake air is additionally guided through the partial area and generates, in addition to the above-described positive tumble flow, a tumble flow in a direction opposite to the positive tumble flow is generated in the combustion chamber 12. The tumble flow in this direction is hereinafter referred to as a reverse tumble flow.

Owing to the influence of the mask portion 23a, the time at which each intake port 23 is opened at the partial area is later than the time at which the intake port 23 is opened at the area near the exhaust ports 24. Therefore, the reverse tumble flow is generated at a time later than the time at which the positive tumble flow is generated. In addition, owing to the operation of the mask portion 23a, the flow rate of the intake air guided through the partial area of each intake port 23 is smaller than the flow rate of the intake air guided through the area near the exhaust ports 24. Therefore, the reverse tumble flow is weaker than the positive tumble flow.

Accordingly, the positive tumble flow travels along a large loop in a section where the exhaust ports 24 are disposed, and encounters the reverse tumble flow at a substantially central area on the top surface of the piston 15. Since the reverse tumble flow is weak, the positive tumble flow is not disturbed even when the positive tumble flow encounters the reverse tumble flow and is guided toward the spark plug 30 (see FIGS. 8A and 8B).

Then, in the compression stroke, fuel is injected into the cylinder 11 from the injection hole 31a in the injector 31 toward the above-described positive tumble flow. Accordingly, the fuel is guided toward the spark portion 30a and is appropriately stratified.

Since the fuel is stratified in an area near the spark portion 30a, ignition retard control can be performed without reducing the ignition quality even in the fast idle range I immediately after the start of the engine. Therefore, a large amount of thermal energy generated by the combustion can be supplied to an exhaust side and the catalyst can be quickly activated.

If the ECU 50 proceeds from step S102 to step S106, the ECU 50 determines whether or not the current operating state of the engine 1 is in the low-speed high-load range B. The ECU 50 proceeds to step S107 if the operating range of the engine 1 is the low-speed high-load range B, and to step S110 if the operating range of the engine 1 is a range other than the low-speed high-load range B (that is, the low-speed low-load range A or the high-speed high-load range C).

When the ECU 50 proceeds from step S106 to step S107, the ECU 50 sets the maximum lift Lmax of the intake valves 25 in the open state to the intermediate lift (for example, 5 to 6 mm), and sets the valve-opening timing of the intake valves 25 to an intermediate angle. Then, the ECU 50 proceeds to step S108, where the ECU 50 sets the valve-opening timing of the exhaust valves 26 to an intermediate angle. Then, the ECU 50 proceeds to step S109, where the ECU 50 sets the fuel injection timing of the injector 31 to an intake stroke (see part (b) in FIG. 5). Then, the routine is terminated.

Owing to the above-described settings, appropriate homogeneous combustion can be achieved in the low-speed high-load range B of the engine 1.

More specifically, when the maximum lift Lmax of the intake valves 25 is set to the intermediate lift, in the first half of the operation of lifting the intake valves 25, each intake port 23 is opened only at the area where the mask portion 23a is not provided, that is, at the area near the exhaust ports 24. The intake air is guided into the combustion chamber 12 through this area and flows along the top surface of the pent-roof-shaped combustion chamber 12 toward the exhaust valves 26. Thus, the positive tumble flow is generated.

Then, in the second half of the operation of lifting the intake valves 25, each intake port 23 is further opened at the partial area that corresponds to the mask portion 23a. Accordingly, the intake air is additionally guided through the partial area and generates, in addition to the above-described positive tumble flow, the reverse tumble flow is generated in the combustion chamber 12.

Owing to the influence of the mask portion 23a, the time at which each intake port 23 is opened at the partial area is later than the time at which the intake port 23 is opened at the area near the exhaust ports 24. Therefore, the reverse tumble flow is generated at a time later than the time at which the positive tumble flow is generated. In addition, owing to the operation of the mask portion 23a, the flow rate of the intake air guided through the partial area of each intake port 23 is smaller than the flow rate of the intake air guided through the area near the exhaust ports 24. Therefore, the reverse tumble flow is weaker than the positive tumble flow.

Accordingly, the positive tumble flow travels along a large loop in a section where the exhaust ports 24 are disposed, and encounters the reverse tumble flow at a substantially central area on the top surface of the piston 15. Since the reverse tumble flow is weak, the positive tumble flow is not disturbed even when the positive tumble flow encounters the reverse tumble flow and is guided toward the spark plug 30 (see FIGS. 8A and 8B).

Then, in the intake stroke, fuel is injected into the cylinder 11 from the injection hole 31a in the injector 31 toward the above-described positive tumble flow. Accordingly, the fuel mainly flows together with the positive tumble flow and circulates in the combustion chamber 12. In this case, since the top surface of the piston 15 is formed as a smooth surface, the persistence of the tumble flow is maintained at a high level. In addition, when the piston 15 reaches a position near the top dead center, the positive tumble flow is disturbed by the function of the squish areas 12a. Therefore, the intake air is strongly disturbed in the combustion chamber 12 and a highly uniform fuel-air mixture is generated.

When the ECU 50 proceeds from step S106 to step S110, the ECU 50 determines whether or not the current operating state of the engine 1 is in the low-speed low-load range A. The ECU 50 proceeds to step S111 if the operating range of the engine 1 is the low-speed low-load range A, and to step S114 if the operating range of the engine 1 is a range other than the low-speed low-load range A (that is, the high-speed high-load range C).

When the ECU 50 proceeds from step S110 to step S111, the ECU 50 sets the maximum lift Lmax of the intake valves 25 in the open state to the low lift (for example, 2 to 3 mm), and sets the valve-opening timing of the intake valves 25 to a most advanced angle. Then, the ECU 50 proceeds to step S112, where the ECU 50 sets the valve-opening timing of the exhaust valves 26 to a most retarded angle. Then, the ECU 50 proceeds to step S113, where the ECU 50 sets the fuel injection timing of the injector 31 to an intake stroke (see part (c) in FIG. 5). Then, the routine is terminated.

Owing to the above-described settings, appropriate homogeneous combustion can be achieved in the low-speed low-load range A of the engine 1.

More specifically, when the maximum lift Lmax of the intake valves 25 is set to the low lift, the intake port 23 is opened only at the area where the mask portion 23a is not provided, that is, at the area near the exhaust ports 24 at all times, and this area is small. Therefore, the intake air that has been guided into the combustion chamber 12 through this area flows along the top surface of the pent-roof-shaped combustion chamber 12 toward the exhaust valves 26 at a high flow rate. Accordingly, the intake air guided from the intake port 23 forms a strong positive tumble flow that circulates in the entire area of the combustion chamber 12 even when the rotational speed of the engine 1 is low (see FIGS. 7A and 7B).

Then, in the intake stroke, fuel is injected into the cylinder 11 from the injection hole 31a in the injector 31 toward the above-described positive tumble flow. Accordingly, the fuel mainly flows together with the positive tumble flow and circulates in the entire area of the combustion chamber 12. In this case, since the top surface of the piston 15 is formed as a smooth surface, the persistence of the positive tumble flow is maintained at a high level. In addition, when the piston 15 reaches a position near the top dead center, the positive tumble flow is disturbed by the function of the squish areas 12a. Therefore, the intake air is strongly disturbed in the combustion chamber 12 and a highly uniform fuel-air mixture is generated. As a result, a high exhaust gas recirculation (EGR) limit (lean limit) can be obtained in the low-speed low-load range A.

In this case, in the low-speed high-load range B, it is difficult to provide a sufficient dynamic effect relative to the intake air since the engine rotational speed is low and the maximum lift Lmax is set to the low lift. However, a necessary and sufficient amount of air can be sucked in by setting the valve-opening timing of the exhaust valves 26 (i.e., the valve-closing timing thereof) to a most retarded angle and setting the valve-closing timing of the intake valves 25 to a most advanced angle so that the intake valves 25 are closed at a time corresponding to a position near the bottom dead center before the compression stroke.

When the ECU 50 proceeds from step S110 to step S114, the ECU 50 sets the maximum lift Lmax of the intake valves 25 in the open state to the high lift (for example, 10 to 11 mm), and sets the valve-opening timing of the intake valves 25 to a most retarded angle. Then, the ECU 50 proceeds to step S115, where the ECU 50 sets the valve-opening timing of the exhaust valves 26 to a most advanced angle. Then, the ECU 50 proceeds to step S116, where the ECU 50 sets the fuel injection timing of the injector 31 to an intake stroke (see part (d) in FIG. 5). Then, the routine is terminated.

Owing to the above-described settings, appropriate homogeneous combustion can be achieved in the high-speed high-load range C of the engine 1.

In the case where the maximum lift Lmax of the intake valves 25 is set to the high lift, the mask portion 23a temporarily affects the intake air in the first half of the operation of lifting the intake valves 25. Subsequently, the mask portion 23a only serves as a small flow passage resistance and has no substantial influence on the intake air. In the high-speed high-load range C, a weak positive tumble flow is generated by the intake air in the combustion chamber 12 (see FIGS. 9A and 9B). However, when the rotational speed of the engine 1 is high, the gas flow of the intake air is originally strong.

Then, in the intake stroke, fuel is injected into the cylinder 11 from the injection hole 31a in the injector 31 toward the intake air. Accordingly, the fuel is appropriately mixed with the intake air and a highly uniform fuel-air mixture is generated.

In the high-speed high-load range C of the engine 1, the valve-opening timing of the exhaust valves 26 is set to the most advanced angle so that exhaustion is quickly completed. In addition, the valve-opening timing of the intake valves 25 is set to the most retarded angle so that air intake utilizing inertia is continued even after the piston 15 reaches the bottom dead center. Therefore, a sufficient amount of air necessary for obtaining a high output can be sucked in.

According to the present embodiment, the stratified charge combustion can be achieved without forming a cavity or the like in the top surface of the piston 15. Therefore, persistence of the tumble flow generated during the homogeneous combustion can be maintained at a high level, and highly uniform fuel-air mixture can be formed by maximally utilizing the tumble flow. As a result, the stratified charge combustion and the homogeneous combustion can both be achieved at a high level. In addition, since no tumble generator valve, which may serve as a high intake resistance, or the like is necessary, the intake-air charging efficiency can be increased. Therefore, the output of the engine 1 can be increased to a high level.

In the above-described embodiment, a variable valve mechanism capable of controlling the opening state of each of the intake valves 25 and the exhaust valves 26 is explained as an example. However, the variable valve mechanism is not limited to this as long as the maximum lift of the intake valves 25 in each combustion cycle can be switched. In addition, the variable valve mechanism is not limited to those including electromagnetic or hydraulic actuators, and may instead include, for example, a cam-type structure.

What is claimed is:

1. A cylinder injection engine comprising:
a spark plug including a spark portion that faces an inner space of a cylinder at a position between an intake port and an exhaust port, the intake port being opened and closed by an intake valve and the exhaust port being opened and closed by an exhaust valve;
a fuel injection valve provided with an injection hole that faces the inner space of the cylinder;
a variable valve mechanism capable of switching a maximum lift of at least the intake valve in each combustion cycle;
a mask portion provided at a partial area of the intake port at a side opposite the exhaust port so as to stand in a direction in which the intake valve is lifted, the mask portion preventing a part of the intake port from being opened when the intake valve is in a low lift state in which an amount of lift of the intake valve is smaller than or equal to a set amount of lift; and
control means that sets the maximum lift of the intake valve for the variable valve mechanism to an intermediate lift and sets a fuel injection timing of the fuel injection valve to a compression stroke when an operating range of the engine comprises a fast idle range that is immediately after a start of the engine, the intermediate lift being an amount of lift at which the intake valve is moved beyond the mask portion and in a first operation of lifting the intake valve, a positive tumble flow is generated by intake air into the cylinder via area of the intake port at a side the exhaust port, in a second operation of lifting the intake valve after the first operation, in addition to the positive tumble flow, a reverse tumble flow is generated by the intake air into the cylinder via area of the intake port at a side opposite the exhaust port and a flow rate of the reverse tumble flow is limited relative to a flow rate of the positive tumble flow,
wherein, during the first operation of lifting the intake valve, the intake port is opened only at an area near the exhaust port for generating the positive tumble flow, and
wherein, during the second operation of lifting the intake valve after the first operation, the intake port is further opened at the partial area that corresponds to the mask portion for generating the reverse tumble flow, the reverse tumble flow being weaker than the positive tumble flow.

2. The cylinder injection engine according to claim 1, wherein the control means sets the maximum lift of the intake valve for the variable valve mechanism to the intermediate lift and sets the fuel injection timing of the fuel injection valve to an intake stroke when the operating range of the engine comprises a predetermined low-speed high-load range, the intermediate lift comprising the amount of lift at which the intake valve is moved beyond the mask portion and the flow rate of intake air in the partial area is limited relative to the flow rate of the intake air in other areas owing to the mask portion.

3. The cylinder injection engine according to claim 1, wherein the control means sets the maximum lift of the intake valve for the variable valve mechanism to a low lift and sets the fuel injection timing of the fuel injection valve to an intake stroke when the operating range of the engine comprises a predetermined low-speed low-load range, the low lift comprising an amount of lift at which the intake valve is not moved beyond the mask portion.

4. The cylinder injection engine according to claim 3, wherein the control means sets an operation timing of the intake valve for the variable valve mechanism to an advanced angle and sets an operation timing of the exhaust valve for the variable valve mechanism to a retarded angle when the operating range of the engine comprises the predetermined low-speed low-load range.

5. The cylinder injection engine according to claim 1, wherein the control means sets the maximum lift of the intake valve for the variable valve mechanism to a high lift and sets the fuel injection timing of the fuel injection valve to an intake stroke when the operating range of the engine comprises a predetermined high-speed high-load range, the high lift comprising an amount of lift that is greater than the intermediate lift.

6. The cylinder injection engine according to claim 5, wherein the control means sets an operation timing of the intake valve for the variable valve mechanism to a retarded angle and sets an operation timing of the exhaust valve for the variable valve mechanism to an advanced angle when the operating range of the engine comprises the predetermined high-speed high-load range.

7. The cylinder injection engine according to claim 2, wherein the control means sets the maximum lift of the intake valve for the variable valve mechanism to a low lift and sets the fuel injection timing of the fuel injection valve to an intake stroke when the operating range of the engine comprises a predetermined low-speed low-load range, the low lift comprising an amount of lift at which the intake valve is not moved beyond the mask portion.

8. The cylinder injection engine according to claim 2, wherein the control means sets the maximum lift of the intake valve for the variable valve mechanism to a high lift and sets the fuel injection timing of the fuel injection valve to an intake stroke when the operating range of the engine comprises a predetermined high-speed high-load range, the high lift comprising an amount of lift that is greater than the intermediate lift.

9. The cylinder injection engine according to claim 3, wherein the control means sets the maximum lift of the intake valve for the variable valve mechanism to a high lift and sets the fuel injection timing of the fuel injection valve to an intake stroke when the operating range of the engine comprises a predetermined high-speed high-load range, the high lift comprising an amount of lift that is greater than the intermediate lift.

10. The cylinder injection engine according to claim 4, wherein the control means sets the maximum lift of the intake valve for the variable valve mechanism to a high lift and sets the fuel injection timing of the fuel injection valve to an intake stroke when the operating range of the engine comprises a predetermined high-speed high-load range, the high lift comprising an amount of lift that is greater than the intermediate lift.

11. The cylinder injection engine according to claim 1, wherein the spark plug is positioned at a substantially center area of the cylinder.

* * * * *